United States Patent [19]

Hancock

[11] 3,716,375

[45] Feb. 13, 1973

[54] CONTINUOUS BREW FERMENTATION

[75] Inventor: Melburn B. Hancock, Richmond, Va.

[73] Assignee: AMF Incorporated

[22] Filed: April 15, 1970

[21] Appl. No.: 28,582

[52] U.S. Cl. ................99/90 CB, 195/115, 195/141
[51] Int. Cl. .............................................A21d 8/02
[58] Field of Search ............99/90 CB; 195/115, 141

[56] References Cited

UNITED STATES PATENTS

| | | | |
|---|---|---|---|
| 3,078,166 | 2/1963 | Hough et al. | 195/115 X |
| 3,216,908 | 11/1965 | Kratochvil | 195/141 |
| 3,219,319 | 11/1965 | Ash | 195/141 UX |

*Primary Examiner*—A. Louis Monacell
*Assistant Examiner*—James Robert Hoffman
*Attorney*—George W. Price

[57] ABSTRACT

A method for the continuous production of a fermented brew for use in the preparation of dough for bakery products. A fermentable mixture is continuously introduced into a first fermentation chamber wherein, as the fermentation proceeds, the increments of the mixture introduced earlier will remain above the increments introduced later because of their lower relative density. As the increments attain a minimum density they are continuously transferred from the top of the first fermentation chamber into a second fermentation chamber in which, as fermentation proceeds further, the density of the increments increases so that the earlier introduced increments remain below those later introduced. The increments are removed continuously from the second chamber after their density has increased to a predetermined level.

18 Claims, 4 Drawing Figures

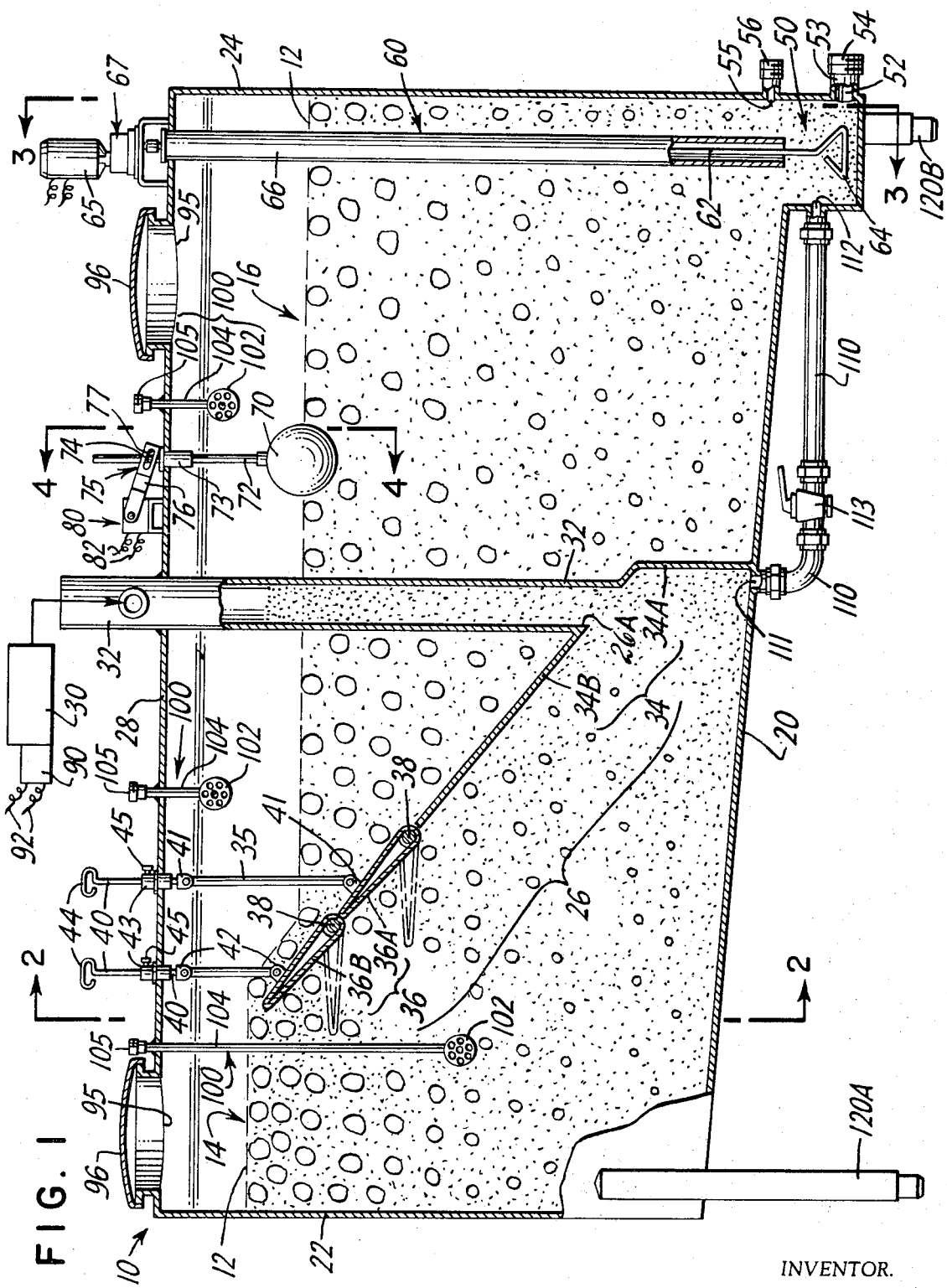

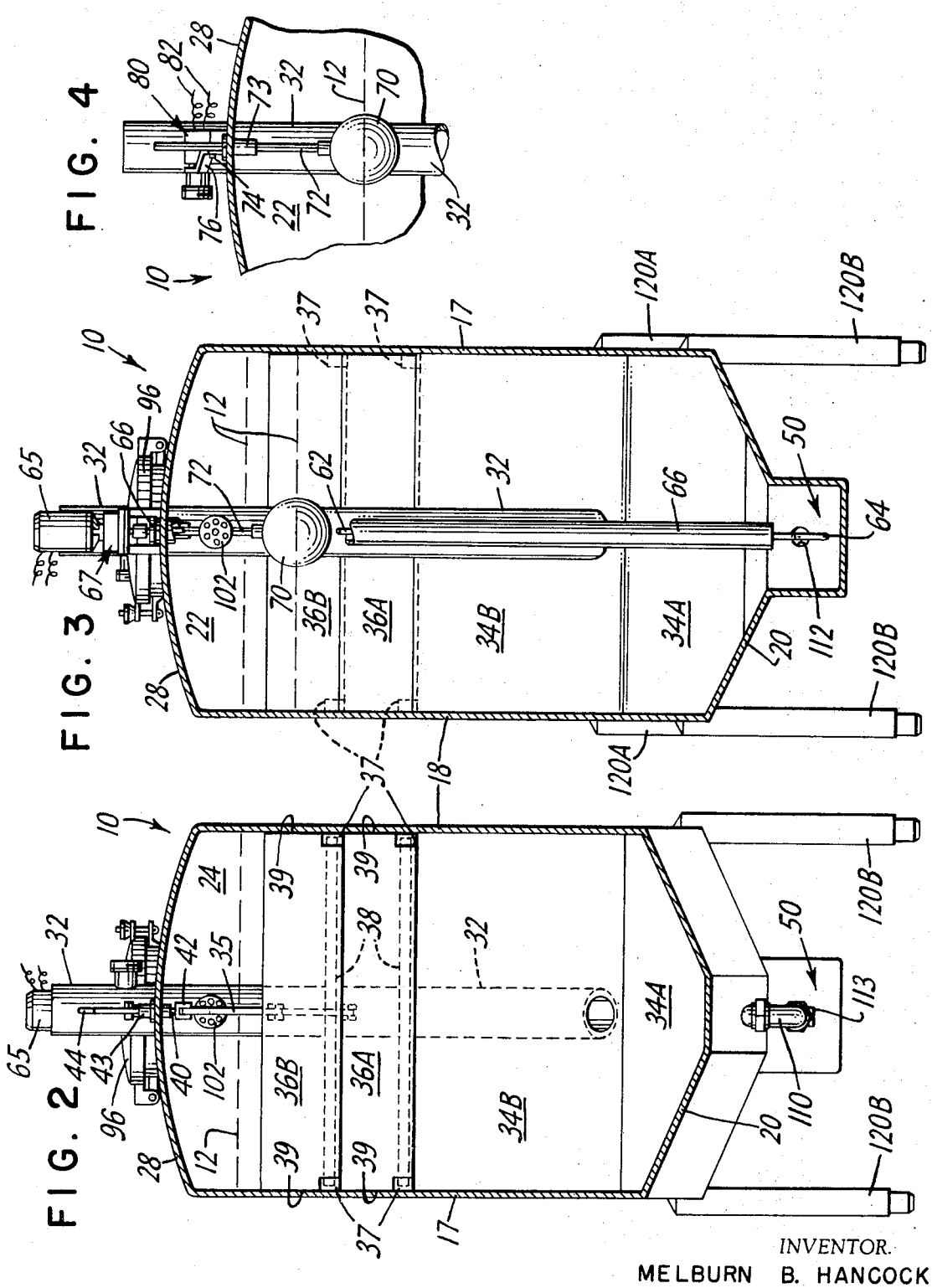

CONTINUOUS BREW FERMENTATION

BACKGROUND AND SUMMARY OF THE INVENTION

Dough for bakery products is commercially prepared via the use of one or the other of two well known processes, the "straight" dough process or the "sponge" process. The former is characterized by the initial step of mixing all of the ingredients which go into the final product together at once for fermentation, the fermented mass being referred to in the art as pre-dough; and the latter process is characterized by a series of steps for making the pre-dough, including mixing less than all of such ingredients together for fermentation and, after fermentation, adding to the resulting "sponge" the remainder of the ingredients to form the pre-dough.

In either process the pre-dough is then ready to undergo further processing. For example, in the event that the final product is to be bread, the pre-dough would basically be subjected to the steps of developing, panning, proofing and baking to form the final product.

To prepare large masses of sponge, the current practise is to combine the ingredients that go into the sponge in batches, or to continuously incrementally combine the ingredients that go into the sponge, and supply them as combined to a plurality of tanks for fermentation.

The tanks are serially filled to the desired level and emptied in the order of filling. For example, when the batch of sponge contained in the first filled tank has reached the desired degree of fermentation, it is emptied, and its contents combined with the remaining ingredients needed to form the pre-dough. When the batch of sponge in the second filled tank is properly fermented, the same procedure is followed, and so on, batch by batch, until all of the tanks are emptied. The prior art processes are said to be "continuous" since as each tank is emptied, it may again be filled with the supply of fermentable brew currently being prepared. For round-the-clock continuity the first filled tank would again be filled just after it is emptied and just after the last tank is filled, and the second tank refilled just after it is emptied, and so on.

Thus, the prior art processes for continuously making pre-dough utilizing the sponge method include the step of successively fermenting a fermentable brew on a batch-by-batch basis. Although different techniques have been tried to do away with this system, they have not been accepted by the bakery industry. As a result, most industrial installations have a large capital investment in sponge fermentation tankage and its associated plumbing for connection to developing apparatus, and must allot a great deal of floor space to such equipment.

In the course of studying this problem, it was discovered that the density of the fermenting brew first decreases to approximately one-half of its initial density, e.g., its density when supplied to the tanks, and thereafter increases in density to approximately eighty percent of its initial density.

With this information a truly continuous fermentation process has been devised utilizing a single tank that eliminates the need for providing a large number of tanks to continuously prepare sponge. Although the sponge experimentally made by this process included flour, water, salt, yeast and nutrients; the process is generally adaptable to continuously fermenting a fermentable brew which is characterized by the fact that its density changes as it ferments, and particularly adaptable to continuously fermenting a fermentable brew mainly including flour, water and a leavening agent.

The invention may be basically described as a process for continuously fermenting a fermentable brew comprising, continuously separating less dense portions of the brew from more dense portion thereof; and may include the step of thereafter continuously fermenting less dense portions for a predetermined time interval, or until the density thereof increases.

In terms of structure, the invention may be basically described as apparatus for continuously fermenting a fermentable brew comprising, means for continuously separating less dense portions of the brew from more dense portions thereof; and may include means for thereafter continuously fermenting less dense portions for a predetermined time interval, or, until the density thereof increases.

The invention may otherwise be described as an improved process for continuously fermenting a fermentable brew including flour, water and a leavening agent, wherein the improvement comprises; continuously combing small quantities of the ingredients of the fermentable brew to successively form portions thereof, continuously successively supplying portions as combined to a chamber for fermentation therein, continuously fermenting each of the portions supplied to the chamber until its density is less than the density thereof when supplied, continuously separating less dense portions from more dense portions, and thereafter fermenting the portions of lesser density for a predetermined time interval.

The apparatus for carrying out the latter process comprises, means for continuously combining small quantities of the ingredients of the fermentable brew to successively form portions thereof, means for continuously successively supplying portions as combined to a chamber for fermentation therein until the density of each portion supplied is less less than the density thereof when supplied, means for continuously separating less dense portions from more dense portions, and means for thereafter fermenting the portions of lesser density for a predetermined time interval.

BRIEF DESCRIPTION OF THE DRAWINGS

FIG. 1 is a vertical elevation of an embodiment of a continuous fermentation tank according to the invention.

FIG. 2 is a sectional view of the tank of FIG. 1 taken substantially along the line 2—2 of FIG. 1.

FIG. 3 is a sectional view of the tank of FIG. 1 taken substantially along the line 3—3 of FIG. 1.

FIG. 4 is a partial sectional view of the tank of FIG. 1 taken substantially along the line 4—4 of FIG. 1

DESCRIPTION OF THE PREFERRED EMBODIMENTS

As a replacement for the large number of tanks used in the prior art for "continuously" fermenting fermentable brews of flour, water and a leavening agent, a continuous fermentation tank as shown in FIGS. 1–4 is provided. As shown in these Figures, wherein like reference numerals designate like or corresponding parts throughout the several views, the continuous fermentation tank of the preferred embodiment is an upright container 10 provided with a partition 26, which divides the container into two chambers, 14 and 16. The container is adapted to receive a fermentable brew 12 in chamber 14 and have it discharged after fermentation from chamber 16. By utilizing only stainless steel sheet metal and fixtures for constructing the tank , chemical activity between the brew and tank is minimized.

In the preferred embodiment the tank container includes a pair of spaced upright side walls, 17 and 18, and a bottom wall 20, shaped from a continuous sheet of metal to obtain the configuration shown in FIGS. 2 and 3, which shape facilitates rapid cleaning. A pair of opposing upright tongue-shaped end walls, 22 and 24, are welded to the sides and bottom of the tank and, close the opposing open ends of the elongated U-shaped trough formed by the tank's side and bottom walls. The partition member 26 is mounted intermediate the end walls by welding to the inner surfaces of the side and bottom walls. An elongated rectangularly-shaped top wall 28, is welded to the upper ends of the side and end walls, and acts as a cover for the tank.

The preferred means for adapting chamber 14 to receive fermentable brew from a source of brew, such as a source 30 located externally of the tank, is an upright open-ended conduit 32 having its upper end connected to the source and its lower end welded to the lower end of partition 26 so that it is in registry with a suitably sized opening 26A formed in the partition, an opening through which brew from the conduit may enter the inlet chamber 14. Thus the source 30 and inlet chamber 14 are preferably brought into fluid flow communication with one another via a conduit which directs brew from the source toward the bottom of the inlet chamber. This arrangement, in contradistinction to introducing incoming brew at the top of the chamber, prevents the incoming brew from commingling with the previously supplied partially fermented brew in the inlet chamber, and causing the release of its gas content.

When making sponge, source 30 is preferably used to continuously successively combine small quantities of flour, water, salt, yeast and nutrients at a predetermined rate for continuously forming successive portions of a fermentable brew. Since the portions are successively supplied at their rate of formation to the inlet chamber 14, the rate of formation and rate of supply are the same. The predetermined rate is generally chosen in consideration of the volume of the inlet chamber 14 and the length of time taken by a given portion of the brew 12 to reach its least dense condition, to ensure having the brew overflow the partition 26 before it starts becoming more dense. In practise, it was found that when the inlet chamber had a fixed volume, each variety of brew processed had to be supplied at a characteristic rate for the particular variety to ensure having the brew of least density continuously overflow the partition. To allow for processing a given brew at different rates, the preferred embodiment of the partition has provision for changing the volume of the inlet chamber in consideration of the rate of formation and/or supply and the time taken by the brew to become less dense.

The preferred partition 26 acts as a means for continuously separating less dense portions of brew from more dense portions. It includes a stationary lower member 34 welded in place to the bottom and side walls of the tank, and at least one movable upper member 36 connected to the tank for varying the volume of the inlet chamber. The lowermost part 34A of the stationary member 34 extends upwardly from the bottom of the tank and toward the tank's cover, whereas the uppermost part 34B extends upwardly from the lowermost part 34A and toward end wall 22. The effect of this construction is to gradually reduce the lateral cross-sectional area of the inlet chamber from its bottom to top, an effect which has been found to be aid in preventing the less dense brew at the top of the inlet chamber from commingling with more dense brew below.

Each of the movable members 36 is a rectangularly-shaped member laterally extending from one side of the tank to the other. In the case of a single movable member 36A, although it may be slidably or pivotally connected to the stationary member 34 without departing from the spirit and scope of the invention, it is preferred that it be pivotally connected to the side walls, 17 and 18, of the tank to facilitate cleaning. Thus the pivot shaft 38 of the member has each of its ends journalled for rotation in a bearing bushing 37 welded to the respective opposing sidewalls 17 and 18 of the tank. The lowermost end of the movable member 36A is arranged in wiping and/or sealing relationship with the uppermost end of the stationary member to prevent the brew in the chambers from passing between chambers via a space between the stationary and movable member. Similarly, it is preferred that the lateral edges 39 of the movable member are arranged to be in wiping and/or sealing relation with the side walls of the tank, to prevent brew from passing between the chambers via spaces between the movable member and the side walls.

In the case of having more than one movable member 36; the first of them, 36A, would be mounted next adjacent to the stationary member 34 and be constructed and arranged as hereinbefore set forth; and the second and any subsequent member 36B would be pivotally connected to the side walls of the tank in the same manner as the first movable member. Of course, the lower end of the second movable member 36B would be arranged in wiping and/or sealing relationship with the upper end of the first movable member, and the lateral edges of the second member be arranged in wiping and/or sealing relationship with side walls of the tank.

In the preferred embodiment, each of the movable members 36 is of hollow, air-foil-like, construction to curve its lower end for ease of cleaning. In operation practise, the members 36 are pivoted within the tank by means of vertically moving an upright rod 40 having its lower end pivotally connected to the upper surface of the member, for example via the use of the link 35, lug 41 and pin 42 arrangement shown in FIG. 1. Each of the rods 40 extends through the cover of the tank and is slidably mounted in a bearing bushing 43 carried by the cover. The upper ends of the rods are respectively terminated by appropriately formed handles 44, to raise and/or lower the rods; and the lower ends thereof are respectively pivotally connected to the upper end of a link 35 having its lower end pivoted to the member, to transmit the motion of the rods to the members. To pivot one of the members 36, a lock nut 45, which is threadably mounted in the upper end of each of the bearing bushings 43, is loosened to allow the rod 40 to be moved lengthwise. Vertical motion of rod 40 swings the free end of the member 36 to which it is attached either upwardly or downwardly to raise or lower the effective height of the partition. After adjusting the height of the upper end of one of the movable members, and thus the height of the partition, the lock nut 45 is tightened in place to retain the member in that position. Since the height of the partition determines the volume of the inlet chamber, raising or lowering its effective height changes the volume of the inlet chamber.

When making sponge, the rate of flow of brew through the inlet chambers is established to ensure having overflow of the partition when the brew's density is approximately 50 percent of its initial density, the density of the brew when supplied to the inlet chamber. In practise, this requirement calls for each portion of the brew to remain in the inlet chamber for a period of approximately 1 hour before entering the outlet chamber 16. The brew thereafter becomes gradually more dense in the outlet chamber. In the outlet chamber the fermentation process continues until the brew achieves a density of approximately eighty percent of the aforesaid initial density. In practise, this requirement calls for each portion of the brew to remain in the outlet chamber for a period of approximately two hours. Accordingly, in the preferred embodiment of the volume of the outlet chamber is approximately twice the volume of the inlet chamber.

In operation, each incremental portion of the brew that enters the inlet chamber 14 is followed successively and continuously by other incremental portions. As the initial portion ferments in the chamber it becomes progressively less dense and migrates upwardly in the chamber 14 with respect to the later introduced portions. As succeeding incremental portions are introduced into chamber 14 through inlet 26A they migrate to the bottom with respect to the earlier introduced portions, since, having not yet fermented, they are denser than the earlier introduced incremental portions which are progressively less dense in proportion to the time spent fermenting in the chamber. Accordingly, a layered arrangement develops in the chamber with the layers getting progressively less dense from the bottom to the top of the fermenting brew mass in the chamber. The height of wall 26 is selected such that the density of the portion of the brew being fermented at the top of the wall is the least in the cycle so that the lightest brew spills over into chamber 16.

In one embodiment of the invention only the outlet opening 52 may be provided and be connected in fluid flow communication with a pump (not shown) for continuously discharging sponge from the outlet chamber. For this embodiment the outlet chamber is preferably provided with an open-ended discharge conduit 53 having one end connected to the tank in registry with the outlet opening 52 and the other end adapted to be connected to the suction side of the pump, as by external thread 54.

In another embodiment, it is preferred that two openings are provided in the outlet chamber, the aforesaid outlet opening 52 and a feedback opening 55. In this case, in addition to the discharge conduit 53 hereinbefore described, an open-ended feedback conduit 56, of lesser cross-sectional area than the discharge conduit, is provided for connecting the discharge side of the pump in fluid flow communication with the outlet chamber through the feedback opening 55. In the operation, more than enough sponge is pumped through the discharge conduit 53 than is necessary to continuously supply the developer or mixer, connected to the discharge side of the pump, and the excess sponge from the pump's discharge side is returned through the feedback conduit 56 to the outlet chamber. This arrangement guards against starving the developer or mixer of sponge.

In order to release undesirable accumulations of gas from the sponge just prior to the time it is discharged from the outlet chamber, the tank may be provided with means for agitating the sponge in the well area of the outlet chamber to release the gas. In practise, the agitation means 60 may include a rotatable rod 62, having its lower end terminated by a beater element 64 and upper end connected to a motor 65, mounted by means well known in the art on the cover of the tank. The beater element 64 is preferably located within the well portion of the outlet chamber as shown, close to the outlet opening 52. Since it is undesirable to release gas from the brew before it has achieved the desired state of density, the rod 62 is preferably laterally enclosed in an open-ended brew shielding tube 66 depending from the cover of the tank to prevent the rod from agitating the brew above the beater element 64.

The upper end of the tube 66 extends through the cover of the tank and is welded in place thereto in registry with an appropriately sized opening in the cover. The rod extends into the tank and axially of the tube, the lower end of which is terminated an appropriate distance above the beater element so as to not interfere with its function. In practise, it has been found desirable to rotate the beater element at a rate of approximately 200 to 250 rpm. In any event, appropriate motor speed changing means 67 may be interposed between the output of the motor 65 and upper end of the rod 62 for adjusting the rate of rotation of the rod as desired.

The preferred embodiment may also be provided with means for adjusting the rate of formation, and thus the rate of supply, of fermentable brew to the inlet chamber; in response to the demand of the developer or mixer, and/or in response to the amount of brew within the outlet chamber. The tank may therefore be provided with floatable means, such as the hollow ball 70 and stem 72, operatively associated with a switch 80 for signaling appropriate means 90 at the source 30 to adjust the rate of formation of brew for supply to the inlet chamber.

As shown in the Figures, the stem 72 may be slidably mounted in a bearing bushing 73 carried by the tank's cover, and be provided with a camming element 74 extending sidewise therefrom and into an elongated opening 75 formed in one end of an arm 76. The other end of the arm 76 is pivotally connected to the switch 80, by means of a pin, for actuation of the switch. The wall 77, of the opening 75, constrains the end of the arm with which it is associated to move upwardly and downwardly in response to reciprocatory motion of the camming element 74, as the ball-stem combination is raised or lowered in response to a change in surface level of brew within the outlet chamber. The switch 80, may be a two position switch having electrical wires 82 adapted to be connected together, or disconnected from one another, in response to the actuating arm being raised or lowered to a predetermined position, a position which corresponds to the desired level of brew within the outlet chamber. The wires 82 may be connected by means well known in the art to corresponding wires 92 at the source 30, and to a source of current (not shown). Accordingly, when the arm 76 is raised or lowered to the aforesaid predetermined position to cause the switch 80 to operate, the means 90 at the source 30 is electrically signaled via wires 82 and 92 to automatically adjust the rate of formation of brew and/or supply to the inlet chamber from one rate to another. Thereafter, when the signal is changed, as evidenced by a further change in the position of the arm 76, the rate of formation of brew may be automatically readjusted to the original rate. Since the demand of the developer or mixer is evidenced by having more or less brew in the outlet chamber, the aforesaid arrangement of apparatus adjusts the rate of formation and/or supply of brew in consideration of the demand for sponge.

To facilitate cleaning the tank, it may be provided with a pair of manhole openings 95 in its cover 28 for access to the interior of the chambers 14 and 16. The openings 95 may be respectively provided with a closure 96 hinged to the cover by means well known in the art, for closing the openings when not in use.

In addition, and also for ease of cleaning, the cover may be fitted with a plurality of appropriately located liquid spraying equipment terminals 100, pendantly supported by the cover. In practise, the respective terminals may include a hollow perforated liquid spraying head 102 connected in fluid flow communication with one end of an open-ended tube 104 carried by the cover of the tank. As shown, the tube 104 extends upwardly through an appropriately sized opening in the cover of the tank, is welded in place to the cover, and provided with appropriate means, such as the external threads 105, for connecting the free end of the tube to a source of supply of cleaning fluid.

Whether or not the aforesaid terminals are provided; for ease of cleaning the inlet chamber, apparatus for draining the inlet chamber may be provided, including a normally closed open-ended conduit 110 having one end connected in fluid flow communication with an opening 111 in the inlet chamber portion of the base of the tank and the other end likewise connected to an opening 112 in the outlet chamber portion of the base of the tank. The conduit is normally closed by means of a valve 113, located between the ends of the conduit, which is operable to open the conduit as needed. In practise, the inlet chamber opening 111 is preferably located adjacent the partition 26 and centrally of the base, to drain the inlet chamber at its lowest point; and the outlet opening 112 is preferably located in the well portion of the inlet chamber to carry fluid from the inlet chamber directly to a point in the outlet chamber which is adjacent the outlet opening 52.

Legs of appropriate height and from, such as the legs 120A and 120B, respectively located at the inlet and outlet chamber end of the tank and connected thereto, may be provided as required to support the tank such that the base of the tank is disposed as hereinbefore described.

What is claimed is:

1. A method of producing a fermented mixture for use in the preparation of dough for bakery products, wherein during the fermentation of the mixture the density thereof decreases to a minimum and thereafter, upon continued fermentation, the density thereof increases comprising the steps of:

introducing a fermentable mixture comprising flour, water and a fermentative leavening agent continuously into a first fermentation chamber wherein, as the fermentation proceeds, the increments of the mixture introduced into the chamber earlier will remain above the increments introduced therein later because of their lower density in comparison thereto, continuously transferring the increments of the mixture that have fermented until they have reached a minimum density from the top of the mixture in the first fermentation chamber to a second fermentation chamber, and removing increments of the mixture from the second fermentation chamber after the density thereof has increased to a predetermined level.

2. A method of producing a fermented mixture according to claim 1, comprising the further step of:

combining the ingredients of the fermentable mixture prior to introducing them into the first fermentation chamber.

3. A method of producing a fermented mixture according to claim 2, wherein:

the ingredients of the fermentable mixture are combined continuously, and the combined ingredients are continuously introduced into the first fermentation chamber.

4. A method of producing a fermented mixture according to claim 3, wherein:

the mixture is introduced into the first fermentation chamber at the same rate as it is combined.

5. A method of producing a fermented mixture according to claim 1, wherein:

as the fermentation proceeds in the second fermentation chamber the increments of the mixture introduced therein earlier will remain below the increments introduced later because of their higher density in comparison thereto.

6. A method of producing a fermented mixture according to claim 5, wherein:

the increments of the mixture removed from the second fermentation chamber are removed from adjacent the bottom thereof.

7. A method of producing a fermented mixture according to claim 1, wherein:

the minimum density of the mixture is approximately one-half the original density, and the predetermined level is approximately four-fifths of the original density.

8. A method of producing a fermentable mixture according to claim 1, wherein the rate the increments of the mixture are removed from the second fermentation chamber is approximately equal to the rate the mixture is introduced into the first fermentation chamber.

9. A method of producing a fermentable mixture according to claim 1, wherein:
the fermentable mixture is introduced into the first fermentation chamber at the bottom thereof.

10. A method of producing a fermented mixture for use in the preparation of dough for bakery products, wherein during the fermentation of the mixture the density thereof decreases to a minimum and thereafter, upon continued fermentation, the density thereof increases, comprising the steps of:
introducing a fermentable mixture comprising flour, water and a fermentative leavening agent continuously into a first fermentation chamber wherein, as the fermentation proceeds, the increments of the mixture introduced into the chamber earlier will remain above the increments introduced therein later because of their lower density in comparison thereto,
continuously transferring increments of the mixture from the top of the mixture in the first fermentation chamber to a second fermentation chamber before the density of the increments begins to increase, and
removing increments of the mixture from the second fermentation chamber after the density thereof has increased to a predetermined level.

11. A method of producing a fermented mixture according to claim 10, comprising the further step of:
combining the ingredients of the fermentable mixture prior to introducing them into the first fermentation chamber.

12. A method of producing a fermented mixture according to claim 11, wherein:
the ingredients of the fermentable mixture are combined continuously, and
the combined ingredients are continuously introduced into the first fermentation chamber.

13. A method of producing a fermented mixture according to claim 12, wherein:
The mixture is introduced into the first fermentation chamber at the same rate as it is combined.

14. A method of producing a fermented mixture according to claim 10, wherein:
as the fermentation proceeds in the second fermentation chamber the increments of the mixture introduced therein earlier will remain below the increments introduced later because of their higher density in comparison thereto.

15. A method of producing a fermented mixture according to claim 14, wherein
the increments of the mixture removed from the second fermentation chamber are removed from adjacent the bottom thereof.

16. A method of producing a fermented mixture according to claim 10, wherein:
the minimum density of the mixture is approximately one-half the original density, and
the predetermined level is approximately four-fifths of the original density.

17. A method of producing a fermentable mixture according to claim 10, wherein the rate the increments of the mixture are removed from the second fermentation chamber is approximately equal to the rate the mixture is introduced into the first fermentation chamber.

18. A method of producing a fermentable mixture according to claim 10, wherein:
the fermentable mixture is introduced into the first fermentation chamber at the bottom thereof.

* * * * *